July 30, 1968     N. N. STEPHANOFF ET AL     3,394,430
APPARATUS FOR COATING FLUID AND SEMIFLUID
SUBSTANCE WITH SOLID MATERIALS
Filed April 26, 1966
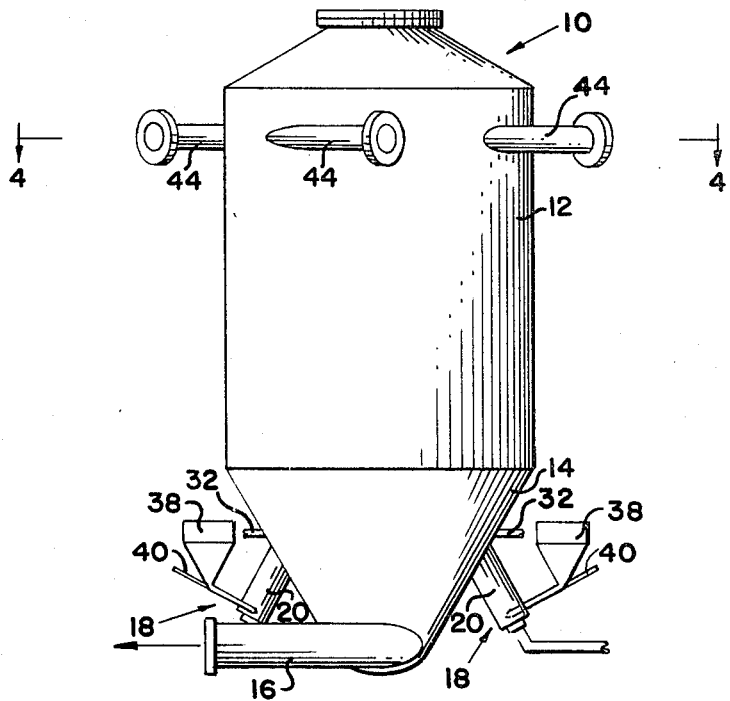
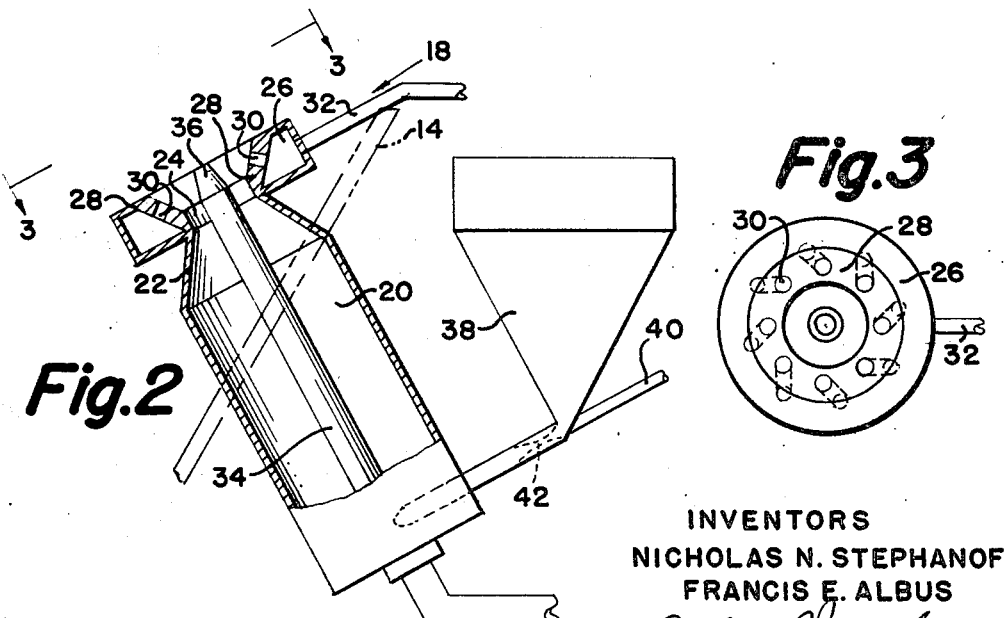
INVENTORS
NICHOLAS N. STEPHANOFF
FRANCIS E. ALBUS
BY *Arthur Jacobs*
ATTORNEY

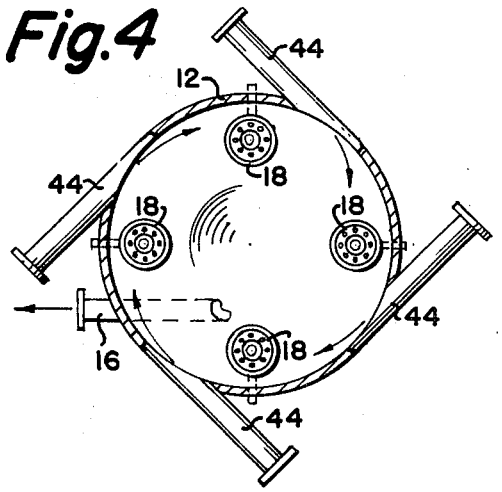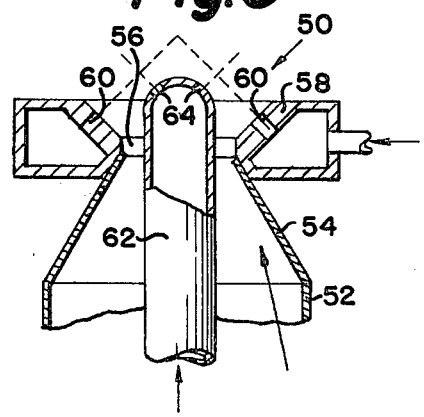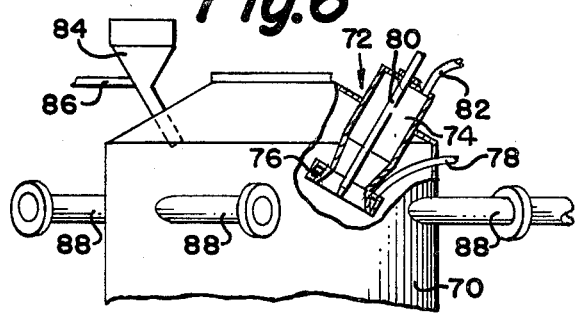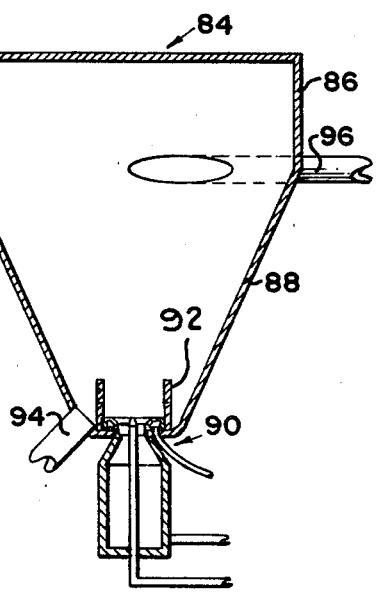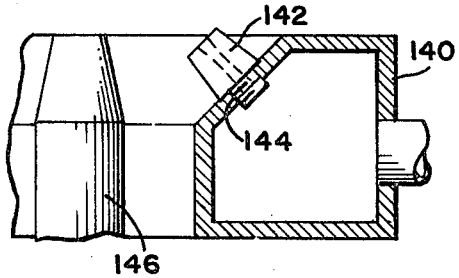

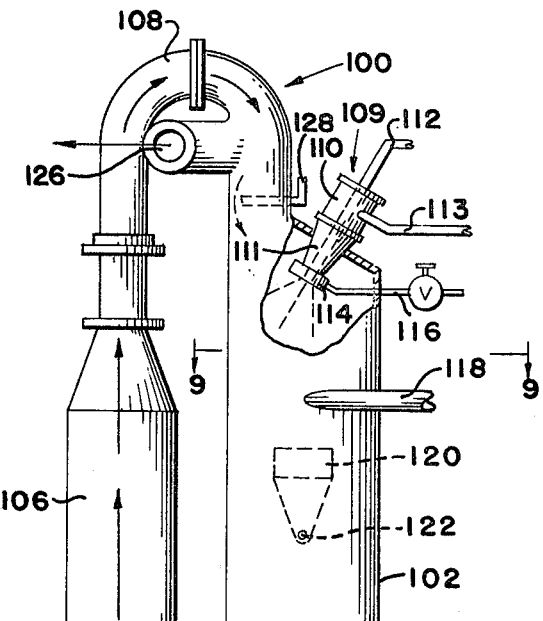
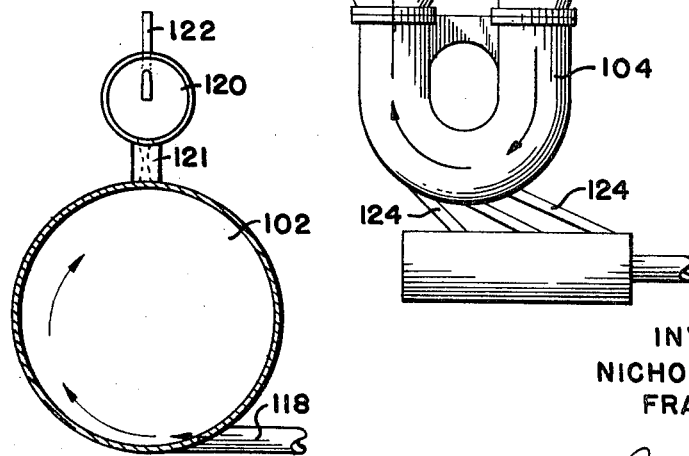
Fig. 8
Fig. 9
INVENTORS
NICHOLAS N. STEPHANOFF
FRANCIS E. ALBUS
BY *Arthur A. Jacobs*
ATTORNEY ମ
United States Patent Office 3,394,430
Patented July 30, 1968

3,394,430
APPARATUS FOR COATING FLUID AND SEMI-FLUID SUBSTANCE WITH SOLID MATERIALS
Nicholas N. Stephanoff, Haverford, and Francis E. Albus, Hatboro, Pa., assignors to Fluid Energy Processing & Equipment Company, Lansdale, Pa., a corporation of Pennsylvania
Filed Apr. 26, 1966, Ser. No. 545,337
6 Claims. (Cl. 18—1)

This invention relates to a method and means for coating, and it particularly relates to a method and means for coating fluid and semifluid substances such as liquids, viscous or plastic materials, etc. with a coating of solid material or material which may become solid upon thermal solidification.

It has heretofore been possible to coat solid materials with a fluid or semifluid substance in various commercially efficient manners, such as by spraying, dipping, painting, brushing, etc. However, such processes cannot be used when it is desired to coat, either completely or partially, or to encapsulate a fluid or semifluid substance with solids or fluid material which may become solid. A commercially effective process for coating fluid or semifluid substances would be invaluable because there are many fluid or semifluid substances, such as food products, chemicals, petroleum products, pharmaceuticals, and the like, which can be easily preserved in this manner so as to obtain a far greater shelf life than is otherwise possible. Such products could also be much more easily handled and packaged in such form.

It is, therefore, one object of the present invention to provide an effective and commercially efficient method for coating fluid and semifluid substances.

Another object of the present invention is to provide apparatus for effectively and efficiently carrying out the aforesaid method.

Other objects and many of the attendant advantages of this invention will be readily appreciated as the same becomes better understood by reference to the following description when read in conjunction with the accompanying drawings wherein:

FIG. 1 is a somewhat diagrammatic, elevational view of an apparatus embodying the present invention.

FIG. 2 is an enlarged, detailed view, partly in section and partly in elevation, of the spray nozzle feed assembly shown in FIG. 1.

FIG. 3 is a top plan view taken on line 3—3 of FIG. 2.

FIG. 4 is an enlarged, detailed sectional view taken on line 4—4 of FIG. 1.

FIG. 5 is a view, partly in section and partly in elevation, of a modified spray-nozzle feed assembly.

FIG. 6 is a fragmentary, sectional view showing an alternative embodiment wherein the spray nozzle assemblies are in the upper portion of the housing.

FIG. 7 is a sectional view, partly broken away in section, of an alternative form of apparatus embodying the present invention.

FIG. 8 is a side view, partly in elevation and partly in section, of a further embodiment of the invention.

FIG. 9 is a cross-sectional view taken on line 9—9 of FIG. 8.

FIG. 10 is a sectional view of a modified form of orifice in the header.

Referring now in greater detail to the various figures of the drawings wherein similar reference characters refer to similar parts, there is shown in FIG. 1 a coating apparatus, generally designated 10, comprising a generally cylindrical housing 12 that is closed at the top and is provided with a lower conical portion 14. An outlet opening is provided at the lower end of portion 14 and connected to this opening is a conduit 16 leading to a collector or the like (not shown).

At least one, but preferably a plurality (as shown) of spray nozzle feed assemblies, generally designated 18, are connected to the conical portion 14 so as to project a spray upwardly into the portion 14 of the housing (as best seen in FIG. 1).

Each spray nozzle feed assembly 18 is substantially identical so that a description of one constitutes a description of all. In this context, FIG. 2 shows the detail of the spray assembly 18 wherein there is provided a subtantially cylindrical chamber 20 extending at an inclined angle into the housing portion 14. The chamber 20 is provided with a conical neck portion 22 which is positioned within the housing portion 14. The conical neck 22 terminates in a relatively narrow cylindrical mouth 24 which is surrounded by an annular, hollow header 26. The header 26 has a downwardly and inwardly inclined inner wall 28 in which are provided a plurality of annularly-spaced nozzle orifices 30. These nozzle orifices 30 are each inclined in two planes, that is, they are each inclined from the interior of the header 26 toward the central axis of the cylindrical mouth 24 (as shown in FIG. 2) and are also inclined in a plane perpendicular thereto (as shown in FIG. 3). In this manner, when fluid jets of air or other gas under pressure issue from these nozzle orifices, they are not only projected inwardly toward the axial plane of the mouth 24 but also tangentially to form a rotary stream. The air or other gas enters the header 26 through a conduit 32 connected to a source (not shown) of fluid under pressure.

Extending axially through the chamber 20 is a pipe 34 which, at its lower end, is connected to a source, under pressure, of liquid or the like (not shown), which constitutes the material to be coated, while at its upper end it is provided with a conical outlet 36. The outlet 36 is positioned within the mouth 24 adjacent the plane of the nozzle orifices 30.

The solid pulverulent coating material is introduced through a hopper 38. Leading into the hopper 38 is a conduit 40 connected to a source of fluid (not shown), such as air or other gas, under pressure. As the granular material falls through the hopper 38, it is picked up by the pressure fluid from conduit 40 and projected through a venturi nozzle 42 into the bottom of the chamber 20. The nozzle 42 is tangential to the chamber 20 and the granular material is therefore projected into the chamber in a helical path.

As the liquid or semifluid material issues from the outlet 36, the pressurized air or other gas issuing from the inclined tangential orifices 30 acts to atomize the liquid or semifluid material because of the vortex action of the gas. Since the gas from the orifices 30 has both a forwardly inclined and a tangential component (as best seen in FIG. 3), the atomization is particularly effective. The liquid or semifluid material is caused to swirl forwardly and, at the same time, is enveloped by the low pressure gases, entraining the solids, which pass helically through the chamber 20 around the pipe 34. The nozzle 42 is tangentially disposed opposite to the tangency of the orifices 30 so that the gases in the helical stream passing upwardly through chamber 20 whirl in a direction opposite to that of the gases from the orifices 30. Therefore, the solid particles, as they pass through the mouth 24, rotate in opposite direction to the liquid particles. Upon contact with each other, the solid particles cause the liquid droplets to rotate on their own axes while being simultaneously coated with the solid particles. This rotating or rolling action results in thoroughly coating the liquid particles with the solids.

The conical vortex, formed by the pressure gases issuing from the inclined orifices 30, forms at least a partial vacuum at the outlet 36. This vacuum would ordinarily cause some of the liquid issuing from the outlet 36 to flow behind the conical vortex and encrust the periphery of the outlet 36. However, this encrustation is prevented by the low pressure gases passing up from chamber 20. These gases break the vacuum and thereby prevent the flow-back and resultant encrustation.

The sprays of solid coated liquid droplets emerge from the feed nozzle assemblies 18, described above, into the conical portion 14 of the housing 12. This housing 12, including its portion 14, forms a drying chamber where drying air or other gas is introduced through a plurality of tangential pipes 44 which are connected to a source of such warm air or other gas (not shown). The temperature and pressure of this drying air will vary in accordance with the materials being processed and the results desired. For example, when coating latex particles with clay, it is preferable to use drying air at about 500° F. under 10 to 20 inches water pressure. The drying air or other gas passes down through the housing 12 in a helical path to entrain the sprays coming from the nozzle assemblies 18 and transport the coated liquid particles from the sprays into the outlet conduit 16 while simultaneously drying them.

The drying chamber, constituted by housing 12 and its portion 14, is used because, as the liquid particles dry and evaporation takes place, the liquid particles shrink. This causes the adhering solid particles to move closer together and eventually coalesce together to form a thin solid crust or shell. When this happens, the liquid is insulated from the warm air and further evaporation is prevented. At about this time, the coated particles are exhausted through conduit 16. If only partial coating is desired, the temperature of the drying gas may be made proportionally lower so that by the time the coated particles leave the drying chamber, the liquid has not sufficiently shrunk to permit all the spaced adherent solid particles to coalesce together.

In FIG. 5 there is shown a modified form of spray nozzle assembly, generally designated 50, which comprises a generally cylindrical chamber 52, similar to chamber 20, having an upper conical neck 54 similar to conical neck 22, which terminates in a relatively narrow, cylindrical mouth 56, similar to mouth 24. The mouth 56 is surrounded by a header 58 similar to header 26 and similarly provided with inclined, tangential orifices 60. Extending through the chamber 52 and conical neck 54 is a pipe 62 that is similar to pipe 34 except that instead of having an ordinary outlet from the tip of the pipe to project the liquid in a straight axial path, as in pipe 34, the forward end of pipe 62 is provided with a plurality of angular orifices or slots 64, one for each orifice 60, which project the liquid angularly toward the angular streams of pressure gas issuing from the orifices 60 to impact at about 90° angles. These 90° angle impacts result in a more intensive dispersion of the liquid droplets and consequently a greater degree of coating by the solid granular material.

It should be noted that the nozzle orifices 30 in FIG. 2 and 60 in FIG. 5 provide relatively wide angle sprays. However, the inclination of these orifices can be varied to adjust the position of impact with the liquid. For example, if a long, narrow spray cone is desired, the inclination of the orifices can be made deeper to project the streams more forwardly of the outlet tip of the liquid pipe, while if it is desired to obtain impact very close to the liquid outlet, the inclination of the orifices can be made more shallow and thereby obtain a very wide angle spray.

The above-described apparatus wherein the feed spray nozzles are in the lower portion of the housing is preferable because the liquid and solid particles, in being projected upwardly, against the downward helical flow of the warm gases, remains within the drying atmosphere for a longer period of time. However, it is also within the scope of the present invention to place the feed nozzle inlets at the upper end of the housing in the area of the tangential pipes 44 but with their tangency opposite to that of the pipes 44. In such arrangement, the liquid and solids feed sprays are projected in horizontal countercurrent to the warm air from pipes 44 just as in the above-described form of the invention, but since both streams flow downwardly instead of in vertical countercurrent, the coated particles remain in the drying atmosphere for a shorter period of time and, therefore, there is less shrinkage and a lighter or more porous coating.

This type of arrangement is illustrated in FIG. 6 wherein the housing 70 is provided with a plurality of radially-spaced nozzle assemblies 72 comprising a chamber 74, similar to chamber 20, and having a similar header 76 fed with pressure fluid, such as air or the like, by a conduit 78 connected to a source (not shown). A liquid pipe 80, similar to pipe 34, extends axially through the chamber 74 and is connected to a source of liquid or the like (not shown) similarly to pipe 34. A conduit 82 leads from a source of air or the like under slight pressure (not shown). The pressurized gas from conduit 82 flows down around the pipe 80 and acts, like the gas flowing through chamber 20, to break the vacuum at the liquid outlet to keep the outlet free from encrustation. Although it is within the scope of this invention to substitute for the conduit 82, a hopper assembly such as shown at 38, 40, 42, whereby both gas and solids are fed into the housing, the illustrated form of the invention utilizes a separate solids feed arrangement whereby the hopper 84 for the solids is provided separately and is propelled by pressure fluid from a conduit 86 connected to a source (not shown). Since the angle of entry of the solids from hopper 84 is counter to the angle of entry of the atomized liquid from chamber 74, there is a greater interdispersion of the solid and liquid particles because of the turbulence caused by impact of the two streams.

Heated air or similar gas is brought into the housing 70 by the tangential pipes 88, which are similar to the pipes 44 and set up a helical, downward flow in the same manner.

In FIG. 7 there is shown another embodiment of the invention, generally designated 84, comprising a housing 86 with a lower conical portion 88 similar to the device of FIG. 1. At the lower end, centrally thereof, is provided a spray nozzle assembly 90 which is identical to assembly 18 and will, therefore, not be here further described. Surrounding the mouth of the nozzle assembly 90 is a cylindrical baffle wall 92. Adjacent the baffle wall 92, and at one side of the lower end of the conical portion 88 is an outlet 94. In the upper portion of the housing 86 are tangential warm air pipes 96 similar to pipes 44.

In this embodiment, when the solid coated liquid particles are projected upwardly, in countercurrent to the helical vortex because of their centrifugal force, they descend outwardly of the baffle wall 92 to be exhausted through the outlet 94. This prevents any tendency of the descending particles from depositing on the mouth of the nozzle assembly and causing clogging thereof. This form of the device is more suitable when no dehydration of liquid particles is desired.

In FIG. 8 there is shown an alternative embodiment of the invention which is utilized for obtaining heavier coatings of the solids on the liquid particles than is ordinarily obtained in the above-described types of apparatus. This apparatus, generally designated 100, comprises an annular mill which includes a downstack 102, a bottom elbow portion 104, an upstack 106, and a top elbow portion 108.

The upper end of the downstack 102 is provided with a spray nozzle assembly, generally designated 109. This nozzle assembly 109 is similar to assembly 18 in FIGS. 1 to 3 (except that it faces downwardly rather than upwardly) in that it comprises a chamber 110 having a conical lower portion 111 through which axially extends a liquid pipe 112 connected to a source (not shown). Air or other similar fluid under relatively low pressure enters from a source (not shown) through a conduit 113. The lower end of conical portion 111 forms a mouth that is encircled by a header 114 fed with air or similar fluid, under relatively high pressure, through a conduit 116, connected to a source (not shown), all substantially as in the assembly described at 72 in FIG. 6.

The spray of liquid droplets issuing from the spray assembly 109 passes down through the downstack 102. In its downward movement, it passes through an area of horizontal circulation provided by warm air or similar fluid under pressure entering through tangential pipe 118. This tangentially circulating air forms a horizontal vortex and produces a helical flow through the downstack. Pipe 118 predries the liquid particles before solids are introduced through hopper 120. Nozzles 124 supply additional warm gases to circulate the product in the mill. As the liquid particles continue to move downwardly in the helical vortex, the solid pulverulent material enters through a venturi passage 121 from hopper 120 under propulsion from high pressure air or similar fluid passing through conduit 122 from a source (not shown). When these solid particles impact against the liquid droplets, the droplets are being whirled around by the vortex and, as they rotate, they become coated with solid particles over their entire surface.

The coated liquid particles then pass down through the downstack 102 into the elbow 104. The elbow 104 is supplied with warm, low pressure air or similar fluid which enters through tangential nozzles 124. The fluid from nozzles 124 not only further dries the coated particles but carries them through upstack 106 and through the elbow 108 to an outlet 126. A baffle plate 128 is positioned between the elbow 108 and the downstack 102 for the purpose of preventing most of the circulating warm air and any particles entrained therein from returning to the downstack. A small opening is left at the inner end of the baffle to permit some of the circulating air to enter the downstack but the coated particles, being relatively heavy, circulate adjacent the outer wall because of the larger centrifugal force thereon. These coated particles are, therefore, prevented from entering the downstack by the baffle.

The relatively long period of time during which the coated particles remain in the heated atmosphere during their circulation through the mill to the outlet 126 results in very thorough drying, accompanied by a large amount of shrinking. This results in a very complete coalescence of the solids and, therefore, a very complete, non porous shell around the liquid particles.

In FIG. 10 there is shown a modified form of orifice nozzle in the header indicated at 140. The orifice nozzle comprises a replaceable tip 142 which can be removably positioned in the orifice 144 by any desirable means, such as by screw threading, press-fitting, bolting, pin and slot engagement, etc. The tip 142 can be varied to make the effective orifice opening smaller or larger as well as to increase or decrease the distance between the effective orifice outlet and the outlet of the liquid pipe 146. The replaceable tip 142 can also be either of a convergent-divergent type to obtain superacoustic fluid velocities or of the abrupt type to obtain greater turbulence. By this means, either type tip can be used as desired.

The use of tip 142 enables the effective orifice outlet to be brought closer to the outlet of liquid pipe 146 without any substantial interference with the low pressure fluid flow through the chamber around the liquid pipe. Furthermore, by varying the pressure through the orifices, the liquid droplets can be made smaller or larger. This, incidentally, can also be effected by varying the pressure through the liquid pipe 146.

It is to be understood that the terms fluid and semifluid material, as used herein, includes liquids and viscous or plastic materials such as latex, gels, colloids, synthetic resins, and the like. For example, tomato concentrate, which is a sticky, viscous fluid, has been effectively coated with powdered dry tomato skin. This made it easier to handle and package the tomato concentrate which can then be easily reconverted to its liquid form by pressing or diluting with water. The same treatment can be used to encapsulate fluidized particles of coffee, cocoa, and the like. In fact it can be used for the treatment of any fluid or semifluid substance. It should also be noted that instead of using pulverulent solid material, it is possible to use coating materials which are in liquid or even in vapor form when impacted with the liquids to be coated and then solidify after being deposited on the liquids.

It is to be noted that where there is no introduction of solids into the chamber 20 in FIG. 2, or its corresponding structure in the other figures, but only the introduction of low pressure gases therein, this apparatus can disperse slurries having viscosities above 50,000 centipoises into micron sized particles. Without such flow of low pressure gases, the material would soon clog the liquid nozzle outlet.

Although air has been described above as the type of gas which is used for projection through the chamber 20, orifices 30, pipes 44 and their corresponding parts in the other figures, it is within the scope of the present invention to use steam, nitrogen, oxygen or any other gas, depending on the materials being treated, the type of results desired, etc.

The present method and apparatus can also be used to simultaneously effect a chemical reaction between the liquid or semifluid substances being coated and either the coating materials, whether solid or fluid, or the gases used as the propellants, heating fluids, or the like. Such chemical reaction will, of course, depend on the temperature and pressure conditions within the apparatus as well as on the particular nature of the liquids, solids or gases employed.

Obviously, many modifications of the present invention are possible in the light of the above teachings. It is, therefore, to be understood that within the scope of the appended claims, the invention may be practiced otherwise than as specifically described.

The invention claimed is:

1. Spray nozzle apparatus comprising a generally cylindrical chamber having a mouth at one end, said mouth being encompassed by a header, said header having a plurality of orifices inclined axially outward of said chamber toward the axis thereof and also being arranged tangentially to said axis, means for conducting pressure fluid to said header, a conduit extending axially through said chamber, said conduit being connected to a source of fluid substances and having an outlet nozzle within said mouth, and means for conducting pressure fluid through said chamber, around said conduit and through said mouth.

2. The apparatus of claim 1 wherein feed means are provided for conducting coating substances through said chamber, around said conduit and through said mouth.

3. The apparatus of claim 1 wherein said outlet nozzle has a central outlet orifice to project fluid therefrom in an axial direction.

4. The apparatus of claim 1 wherein said outlet nozzle is provided with angular outlet orifices to project fluid therefrom in angular directions relative to the axis of said conduit.

5. The apparatus of claim 1 wherein the outlet of said apparatus is positioned within a housing, said housing having means for heating the atmosphere therein.

6. The assembly of claim 5 wherein feed means are provided in said housing downstream from the outlet of said apparatus for projecting coating substances, in countercurrent, into the path of fluid projection from the outlet of said apparatus.

References Cited
UNITED STATES PATENTS

| | | | |
|---|---|---|---|
| 2,932,061 | 3/1960 | Jansen | 264—4 |
| 1,756,772 | 4/1930 | Weisberg. | |
| 2,270,341 | 1/1942 | Ramsburg. | |

ROBERT F. WHITE, *Primary Examiner.*

R. B. MOFFITT, *Assistant Examiner.*